F. VOIGTMANN.
FUSIBLE LINK.
APPLICATION FILED MAY 23, 1910.
1,116,518. Patented Nov. 10, 1914.
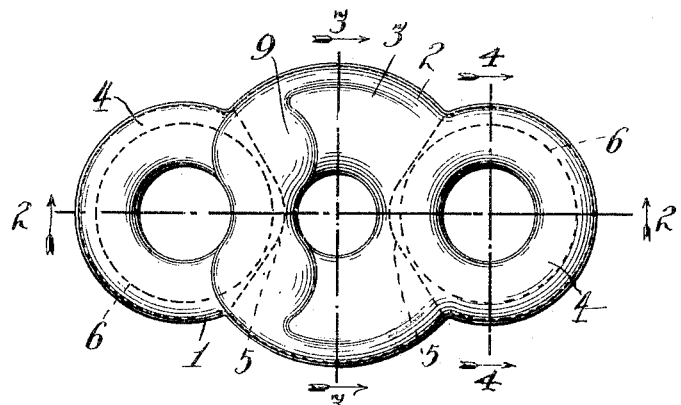
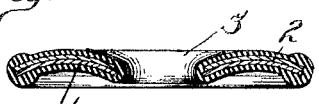
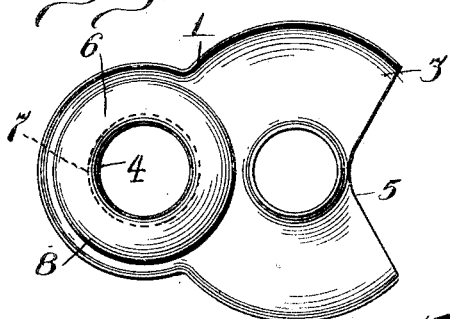
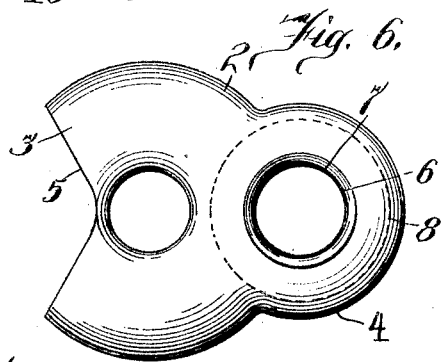
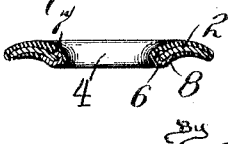
Witnesses
Milton Lenoir
Charles J. Schmidt
Inventor
Frank Voigtmann
By Offield Towle Graves & Offield
Attorneys

UNITED STATES PATENT OFFICE.

FRANK VOIGTMANN, OF CHICAGO, ILLINOIS.

FUSIBLE LINK.

1,116,518.  Specification of Letters Patent.  Patented Nov. 10, 1914.

Application filed May 23, 1910.  Serial No. 562,852.

*To all whom it may concern:*

Be it known that I, FRANK VOIGTMANN, a citizen of the United States, residing at Chicago, in the county of Cook and State of Illinois, have invented certain new and useful Improvements in Fusible Links, of which the following is a specification.

This invention relates to improvements in fusible links of the general type employed for automatically releasing fire doors, windows, etc., whenever the temperature rises above a predetermined height.

The salient object of the present invention is to provide a link which is less susceptible to becoming non-sensitive when coated with dust, calcimine, paint or the like, than those heretofore in use, while at the same time amply strong to sustain the draft or pull thereon, and of such construction that it may be very economically and uniformly manufactured, and by the use of comparatively cheap or unskilled labor.

The invention consists in the matters hereinafter described and more particularly pointed out in the appended claims.

In the drawings wherein I have shown a preferred embodiment of my invention—Figure 1 is a plan or top side view of a link embodying the invention; Figs. 2 and 3 are longitudinal and transverse sections taken respectively on lines 2—2 and 3—3 of Fig. 1. Fig. 4 is a cross section on line 4—4 of Fig. 1. Figs. 5 and 6 are views of opposite sides of the blanks, devoid of solder.

The specific form of the sheet metal parts of the preferred form of the link of my present invention was invented by myself some time ago, and is the subject of a pending application filed by me November 16, 1908, Serial No. 462954. Parts of the links of that application were soldered together in the same general relation as that shown in present application; the soldering having been performed by dipping the parts bodily, while held in proper assembled relation, into a molten bath of solder. This process resulted in giving the entire exposed surface of the sheet metal parts a thin coating of solder and by demonstrations and tests, I determined that a link thus soldered and coated was more sensitive and reliable than where the soldering was performed by simply soldering the over-lapped meeting surfaces together without coating the remainder of the link.

Since making the invention and discovery above referred to, I have made a further discovery which is apparently a paradox, in that I have discovered that a link loaded and containing more metal and which would, therefore, apparently require a greater amount of heat to become heated to a fusing point is nevertheless more sensitive and reliable than one containing less metal. That is to say, I have discovered that by loading a link of this character with solder,—that is, putting on a great excess in thickness of solder at the parts which are to fuse and separate, the sensitiveness and reliability of operation of the link are greatly enhanced. This condition applies and is true with especial emphasis when the link has been coated with something tending to protect it, or insulate it from the heat, as for example, when coated with calcimine, whitewash, or soot.

The construction of link shown herein is now approved by the underwriters and is the best construction now known to me, but the specific shape, the manner in which the overlapping parts are internested or dished together, and other minor details of construction may be varied without departing from my present invention.

Describing the link shown in the drawings, each link is composed of two stampings, as 1 and 2, which may be and preferably are exact counter-parts of each other; each stamping comprising a mutilated main central ring portion 3 and an unmutilated smaller ring shaped loop or eyelet 4 formed integrally with the main ring. The main ring of each member is cut away at its side remote from its loop or eyelet portion 4 as indicated at 5, in such manner that when the two links are assembled with their central main bodies in register, *i. e.*, nested together, the loops or eyelet portions 4 will project at each end beyond the overlapped portions.

The overlapped portions obviously when soldered together, combine to a large extent the strength of both members, and in order that the eyelet portions 4, which are not overlapped may be approximately as strong as the overlapping portions I reënforce these smaller rings by eyeleting the openings thereof with metal eyelets as 6; these eyelets being provided with broad, underlying flanges 8, which fit inside the concave portions of the members 4, while their upper edges are cramped over the peripheries of the openings, as indicated at 7.

The stampings, eyeleted as described are preferably soldered together by placing them in properly assembled relation and gripping them between the jaws of a pair of tongs or pincers provided with pointed teeth, so that their points of engagement with the link are small and, while thus held, are dipped bodily in a bath of molten solder. It will be understood, of course, that before thus soldering the parts, they all have been dipped in a suitable acid so as to take the solder readily.

Having thus assembled and soldered the parts together, I next proceed to load the links with additional solder. Conveniently, I apply this solder by the use of a hand soldering iron in the usual well known manner and take care to build up the solder very heavily across those parts of the link coincident with the edges of the overlapping parts, as indicated at 9 and 10. I also apply the solder thickly around the entire edges of the overlapped portions; the endeavor being to cover the joint at the edge of the overlapping portions thickly at all points. In practice, this results in filling up the interior of the concave central portion of the main link eyelet with solder.

Since my discovery of the supersensitiveness of a link so constructed, I have demonstrated the importance of thus loading the links with solder. The peculiar efficiency or sensitiveness and reliability of the link is most pronounced when the link has been covered with a coating tending to insulate it from heat. The underwriters in testing such links coat them artificially with calcimine, whitewash, or the like, before subjecting them to a heat test; the purpose of this being to reproduce as nearly as may be the adverse conditions to which such links are subject in actual practice. Such tests repeated many times by the underwriters have proven the importance of this new discovery, so that they now insist that all links be thus heavily loaded with solder.

I claim as my invention:

1. A fusible link comprising two thin sheet-like members assembled in overlapping relation and forming when united a relatively flat thin link, said members being entirely coated by readily fusible solder and provided with a thickened extra loading of solder at the separable joints.

2. A thin sheet-like fusible link comprising two sheet-like members stamped into similar intaglio relief configurations and nested together in partially overlapping relation, said members being united by readily fusible solder, completely covering the margins forming the joints between the overlapping portions and applied in heavy excess along and overlying the end margins of the overlapping portions of said members, and said solder forming the exposed exterior surfaces at said joints.

3. A fusible link comprising two thin sheet-like members stamped into similar intaglio-relief configuration, partly overlapped and nested together as to said overlapping portions, said members being entirely coated with readily fusible solder and united thereby and provided with a thickened extra loading of solder overlying the margins along the separable joints between said overlapping parts.

4. A fusible link comprising two thin sheet-like members assembled in overlapping relation and forming when united a thin approximately flat link, said assembled members being completely coated by readily fusible solder and at the separable joints additionally coated with a thickened extra loading of said readily fusible solder.

FRANK VOIGTMANN.

Witnesses:
ALBERT H. GRAVES,
EMILIE ROSE.

Copies of this patent may be obtained for five cents each, by addressing the "Commissioner of Patents, Washington, D. C."